United States Patent [19]
Ishihara et al.

[11] Patent Number: 5,766,321
[45] Date of Patent: Jun. 16, 1998

[54] APPARATUS FOR REDUCING DISSOLVED OXYGEN

[75] Inventors: Yoshio Ishihara; Hiroshi Yamazaki, both of Ibaragi; Sumiyo Yamane, Yamanashi; Koh Matsumoto, Ibaragi, all of Japan

[73] Assignee: Nippon Sanso Corporation, Tokyo, Japan

[21] Appl. No.: 338,547

[22] PCT Filed: Apr. 11, 1994

[86] PCT No.: PCT/JP94/00601

§ 371 Date: Dec. 12, 1994

§ 102(e) Date: Dec. 12, 1994

[87] PCT Pub. No.: WO94/23816

PCT Pub. Date: Oct. 27, 1994

[30] Foreign Application Priority Data

| Apr. 14, 1993 | [JP] | Japan | 5-087567 |
| Sep. 29, 1993 | [JP] | Japan | 5-243386 |
| Sep. 29, 1993 | [JP] | Japan | 5-243387 |

[51] Int. Cl.$^6$ ................................................. B01D 19/00
[52] U.S. Cl. ......................... 96/202; 95/263; 95/265; 96/203; 210/220
[58] Field of Search .................. 95/245, 263, 265; 96/155, 202, 203, 206, 207, 215; 210/220, 747, 703, 170, 900

[56] References Cited

U.S. PATENT DOCUMENTS

| 3,344,587 | 10/1967 | Wakeman | 96/202 |
| 4,358,296 | 11/1982 | Notardonato et al. | 95/245 |
| 4,412,924 | 11/1983 | Feather | 96/202 |
| 4,612,021 | 9/1986 | Bland et al. | 96/202 |
| 4,752,306 | 6/1988 | Henriksen | 95/245 |
| 4,755,195 | 7/1988 | Compton et al. | 95/263 |
| 4,983,285 | 1/1991 | Nolen | 210/220 |
| 5,087,377 | 2/1992 | Josefik | 210/703 |
| 5,112,357 | 5/1992 | Bjerklund et al. | 96/202 |
| 5,217,621 | 6/1993 | Norris | 210/220 |
| 5,614,086 | 3/1997 | Hill et al. | 210/747 |

FOREIGN PATENT DOCUMENTS

| 58-133885 | 8/1983 | Japan | 95/265 |
| 61-68107 | 8/1986 | Japan | . |
| 2-17994 | 1/1990 | Japan | . |
| 2-222763 | 9/1990 | Japan | . |
| 5-301089 | 11/1993 | Japan | 96/203 |

*Primary Examiner*—Duane S. Smith
*Attorney, Agent, or Firm*—Armstrong, Westerman, Hattori, McLeland & Naughton

[57] ABSTRACT

Disclosed is a dissolved oxygen reducing apparatus which enables supplying a liquid containing very small amounts of dissolved oxygen. The dissolved oxygen reducing apparatus includes a bubbling vessel (24) having a liquid charge inlet (21), a liquid discharge outlet (22) and an inert gas discharge port (23), an inert gas sparger (25) provided within the bubbling vessel (24), and a liquid discharge pipe (26) connected to the liquid discharge outlet (22). The bubbling vessel (24) and the liquid discharge pipe (26) have a coefficient of oxygen permeability of not higher than $10^{-9}$ cc·cm/cm$^2$·sec·atm at 25° C.

7 Claims, 4 Drawing Sheets

APPARATUS FOR REDUCING DISSOLVED OXYGEN

TECHNICAL FIELD

The present invention relates to a dissolved oxygen reducing apparatus wherein the content of oxygen dissolved in liquids is reduced.

BACKGROUND ART

In semiconductor manufacturing processes, for example, pure water is used in large amounts for the cleaning treatment of semiconductor devices. Pure water is intended to mean water which contains a small amount of impurities. Actually, a small amount of oxygen is contained in pure water as an impurity.

If oxygen is present, even at a very low concentration, in pure water used for cleaning treatment, a native oxide film is formed on the surfaces of the semiconductor device, thereby causing the device characteristics to deteriorate. For pure water used in semiconductor manufacturing processes, or for pure water for semiconductors, there is a demand to reduce the concentration of dissolved oxygen to a level not higher than 10 ppb.

Hitherto, vacuum degassing apparatuses have been frequently employed as a dissolved oxygen reducing apparatus. However, such apparatuses are disadvantageous in that the dissolved oxygen can be reduced to a concentration as high as approximately 100 ppb, that the apparatus is large in size, and that power costs are great, resulting in economically poor situation. In recent years, attention has been directed to a dissolved oxygen reducing apparatus using an inert gas bubbling method, which is free from the above disadvantages.

In the inert gas bubbling method, while untreated water (water to be treated) flows down in a bubbling vessel, an inert gas is jetted in the form of bubbles from the lower portion of the bubbling vessel, so that the water and the inert gas are subjected to gas-liquid contact to substitute the oxygen gas in the water for the inert gas, thereby eliminating oxygen from the water. The bubbling vessel and the pipes through which the liquid is passed are formed of polyvinyl chloride (PVC) which is a kind of plastic. PVC is excellent in its ease of availability, economy, mechanical strength, corrosion resistance and the like, and it has been used for almost all the general-purpose piping for water.

According to the inert gas bubbling method, the concentration of dissolved oxygen in a liquid can be readily reduced to not higher than 100 ppb and may be reduced to approximately 10 ppb, but has never been reduced to not higher than 10 ppb.

In recent semiconductor manufacturing processes, there are some cases where it is desirable to utilize pure water having a concentration of dissolved oxygen of not higher than 10 ppb, in specific steps such as cleaning of the surfaces of a silicon wafer.

In view of the foregoing, the inventors of the present invention made extensive studies and, as a result, found unexpected problems. To describe in detail, where pure water having an amount of dissolved oxygen of not higher than 10 ppb is prepared and supplied, it has been found that oxygen in the air permeates through the walls of the PVC bubbling vessel and the walls of the PVC pipes through which water after the bubbling treatment is fed, resulting in an increased amount of dissolved oxygen.

As stated hereinabove, PVC is readily available and is used in almost all general-purpose piping for water. Moreover, the bubbling vessel is arranged to have a pressure higher than atmospheric pressure, so that it has never been suspected that oxygen permeates from the air which is lower in pressure than within the bubbling vessel. In fact, with pure water having a dissolved oxygen concentration of approximately 100 ppb, oxygen permeating from the air into water has not been investigated. However, since oxygen in the air actually enters water, the concentration of dissolved oxygen in liquids cannot be reduced to a level of not higher than 10 ppb according to the known inert gas bubbling method.

It is therefore an object of the invention to provide a dissolved oxygen reducing apparatus which is able to provide a liquid containing only a very small amount of dissolved oxygen.

SUMMARY OF THE INVENTION

The dissolved oxygen reducing apparatus of the present invention includes a bubbling vessel having a liquid charge inlet, a liquid discharge outlet and an inert gas discharge port, an inert gas sparger provided within the bubbling vessel, and a liquid discharge pipe connected to the liquid discharge outlet, wherein the bubbling vessel and the liquid discharge pipe have, respectively, a coefficient of oxygen permeability of not higher than $10^{-9}$ cc.cm/$cm^2$.sec.atm at 25° C.

In the dissolved oxygen reducing apparatus, the bubbling vessel and the liquid discharge pipe have vessel walls and pipe walls, respectively, which are made of a low oxygen permeating material or materials having a coefficient of oxygen permeability of not higher than $10^{-9}$ cc.cm/$cm^2$sec.atm at 25° C.

The low oxygen permeating materials may be any materials that satisfy the above requirement for the coefficient of oxygen permeability. Taking into account mechanical strength, ease of availability and similar requirements, among synthetic resins, polyvinylidene fluoride (PVDF), polyether ether ketone (PEEK) or polyphenylene sulfide (PPS) is excellent in view of practical use.

Alternatively, the vessel walls of the bubbling vessel and the pipe walls of the liquid discharge pipe of the dissolved oxygen reducing apparatus may be made of metals with a corrosion-resistant coating treatment such as passivation on the inner surface thereof, metals having a resin coating on the inner surface thereof, or resins having a metal coating on the outer surface thereof. Metals which have been subjected to corrosion resistant coating treatment such as passivation include those covered with an oxide film or a ceramic coating at least on the inner surface of the vessel and pipe.

Furthermore, the vessel walls of the bubbling vessel and the pipe walls of the liquid discharge pipes of the dissolved oxygen reducing apparatus of the invention may be formed to have a double wall structure with an inert gas flow path between the inner and outer walls.

The inert gas flow path may communicate with the inert gas discharge outlet.

In the dissolved oxygen reducing apparatus of the present invention, as stated above, the bubbling vessel is arranged such that the coefficient of oxygen permeability at 25° C. is not higher than $10^{-9}$ cc.cm/$cm^2$sec.atm. Thus, the amount of oxygen in the air which passes through the walls of the bubbling vessel and dissolves in a liquid can be remarkably reduced. The amount of dissolved oxygen can be reduced to a level of not higher than 10 ppb or a level of several ppb. Moreover, since the liquid discharge pipe through which the liquid after the bubbling treatment is passed has a coefficient of permeability the same as the above value, an amount of dissolved oxygen of only several ppb can be maintained over about 1 to 2 hours, thus ensuring a good effect in practical applications.

The coefficient of oxygen permeability is determined by providing a specific type of gas, particularly oxygen, in the case of the present invention at opposite sides of a plate made of a predetermined material, and measuring the amount of permeated oxygen while making the oxygen concentrations of the opposite sides different. That is, the coefficient is measured in a gas-to-gas state. Thus, the coefficient of oxygen permeability used herein is not a value determined in a liquid-to-air state. Conventionally, the permeation of oxygen gas from the air to a liquid in the bubbling vessel has not been investigated. Therefore, it is a matter of course that the coefficient of oxygen permeation in the liquid-to-air relation has never been known in the art.

As a result of extensive investigations, the invention has been accomplished by using a coefficient of oxygen permeability measured in the gas-to-gas state and also using a material having a predetermined coefficient of oxygen permeability as constituent members of the apparatus.

The PVDF, PEEK and PPS used as the low oxygen permeating material have a coefficient of oxygen permeability at 25° C. of not higher than $10^{-9}$ cc.cm/cm$^2$sec.atm. It has been experimentally confirmed that these materials are suited in practice for obtaining a liquid containing a very small amount of dissolved oxygen as intended in the present invention or for obtaining ultra-pure water.

Incidentally, metals hardly have oxygen permeability and are thus favorable as a low oxygen permeating material. However, metals release harmful ions in water upon contact with water. When pure water for semiconductors is desired, therefore, it is necessary that ions should not be dissolved in water. To this end, where metals are used as the walls of the bubble vessel and the liquid discharge pipe, the inner surfaces of the walls should be subjected to a corrosion resistant coating treatment such as passivation or coating with a resin.

The metals subjected to the corrosion resistant coating treatment include, for example, stainless steels, titanium, aluminum and the like on which an oxide film has been formed. Metals coated with a resin on an inner surface include, for example, various types of metals processed into a vessel or pipe of a desired shape wherein at least an inner surface thereof is coated with waterproofing synthetic resins such as a stainless steel pipe which is coated with PVC on its inner surface.

In addition, the use of resins covered with metals on the outer surface thereof is also effective in reducing the permeation of oxygen. The resins covered with metals on their outer surface include a PVC pipe having an outer surface subjected to known metal plating.

The apparatus may be entirely formed of one type of material or individual members of the apparatus may be selectively formed of appropriate materials.

As described above, when the bubbling vessel and the liquid discharge pipe are made of a low oxygen permeating material or materials, the amount of oxygen permeating the walls of the bubbling vessel and the liquid discharge pipe can be reduced to obtain a liquid whose concentration of dissolved oxygen is not higher than 10 ppb. Additionally, the amount of an inert bubbling gas may also be reduced. As a consequence, the concentration of dissolved oxygen can be efficiently reduced, enabling to provide a liquid having a very small amount of dissolved oxygen, such as ultra-pure water, in a more inexpensive manner. Since the amount of an inert gas for bubbling can be reduced and the arrangement of the apparatus can be simplified, facility costs and operation costs are reduced. In addition, it is possible to enhance reliability on the side of consumers who use the liquid in which dissolved oxygen has been reduced.

When the bubbling vessel and the liquid discharge pipe are constructed to have a double wall structure which has an inert gas flow path between inner and outer walls thereof, the bubbling vessel and the pipe are sealed with an inert gas therearound. Eventually, the partial pressure of oxygen around the bubbling vessel and the pipe can be reduced and thus, the amount of oxygen passing through the material for forming the bubbling vessel and the pipe can be reduced. By this, it will be possible to supply a liquid which has a dissolved oxygen concentration of lower than 1 ppb. Because the inert gas used after the bubbling is employed as a sealing gas, the amount of the inert gas can be reduced. Accordingly, even if the apparatus is constituted of inexpensive, general-purpose materials, the amount of oxygen which passes through the material for the vessel and pipe and enters the liquid can be reduced. The amount of dissolved oxygen in the liquid which is supplied for service can be remarkably reduced.

Next, it has been found that according to the known bubbling method, the flow rate of a liquid flowing down to the bubbling vessel is approximately about 1 cm/sec in maximum, so that the liquid runs in a laminar flow condition. This condition disturbs the effect of reducing dissolved oxygen.

Using the dissolved oxygen reducing apparatus of the invention, the flow rate of pure water running through the bubbling vessel is set at 1.6 to 9.0 cm/sec, within which the Reynolds number of the pure water running through the bubbling vessel can be in a turbulence transition region of 2300 or more. Thus, the efficiency of contact with the inert gas rising through the bubbling vessel increases, thereby permitting the dissolved oxygen to be removed to a level of 10 ppb or less. When the flow rate exceeds 9.0 cm/sec, the bubbles of the inert gas are entrained with the stream of water, thus being unfavorable for the bubbling method.

The liquid illustrated above generally means pure water. However, the invention can be applied not only to pure water, but also to various types of chemical solutions and treatment solutions.

DESCRIPTION OF THE PREFERRED EMBODIMENT(S)

The embodiments of the present invention are described with reference to the drawings.

Figure 1:
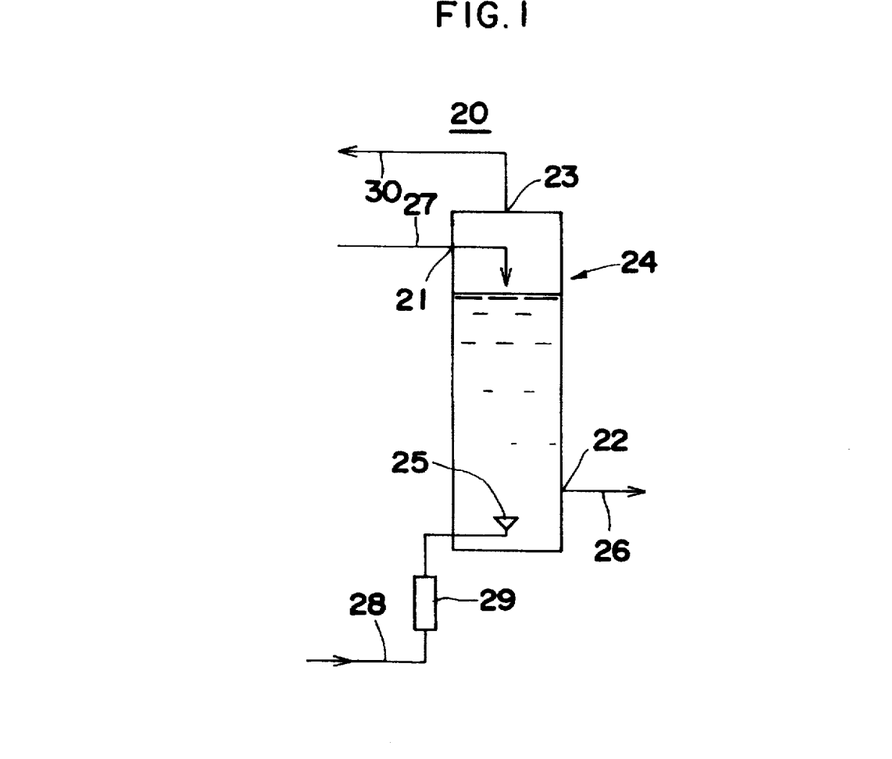
FIG. 1 is a schematic view showing one embodiment of a dissolved oxygen reducing apparatus of the present invention.

FIG. 1 is a schematic view showing one embodiment of the present invention. A dissolved oxygen reducing apparatus 20 of this embodiment includes a bubbling vessel 24 having a liquid charge inlet 21, a liquid discharge outlet 22 and an inert gas discharge port 23, an inert gas sparger 25 provided in the bubbling vessel 24, and a liquid discharge pipe connected to the liquid discharge outlet 22. Reference numeral 27 indicates a liquid charge pipe, 28 an inert gas charge pipe for bubbling through which an inert gas is fed to the inert gas sparger 25, 29 a flow control device and 30 an inert gas discharge pipe.

The bubbling vessel 24 and the liquid discharge pipe 26 are, respectively, arranged so that the coefficient of oxygen permeability at 25° C. is not higher than $10^{-9}$ cc.cm/ $cm^2$.sec.atm.

An untreated liquid is charged from the liquid charge pipe 27 into the bubbling vessel 24. The liquid charged into the bubbling vessel 24 countercurrently contacts with fine bubbles of the inert gas jetted from the inert gas sparger 25 thereby reducing dissolved oxygen therefrom. The liquid treated to reduce dissolved oxygen is supplied from the liquid discharge pipe 26 to end-use. The inert gas entraining the oxygen which has been taken out from the liquid is discharged from the inert gas discharge pipe 30.

In order to form the bubbling vessel 24 and the liquid discharge pipe 26 both having a coefficient of oxygen permeability of not higher than $10^{-9}$ cc.cm/$cm^2$sec.atm at 25° C., the walls of the bubbling vessel 24 and the walls of the liquid discharge pipe 26 are made of a low oxygen permeating material having a coefficient of oxygen permeability of not higher than $10^{-9}$ cc.cm/$cm^2$sec.atm at 25° C, respectively. Alternatively, these vessel and pipe walls are made of a metal which has been subjected to a corrosion-resistant coating treatment, such as passivation, on the inner surface thereof, a metal coated with a resin on the inner surface thereof, or a resin covered with a metal on the outer surface thereof.

The low oxygen permeating material includes PVDF, PEEK, PPS or the like as exemplified above.

Figure 2:
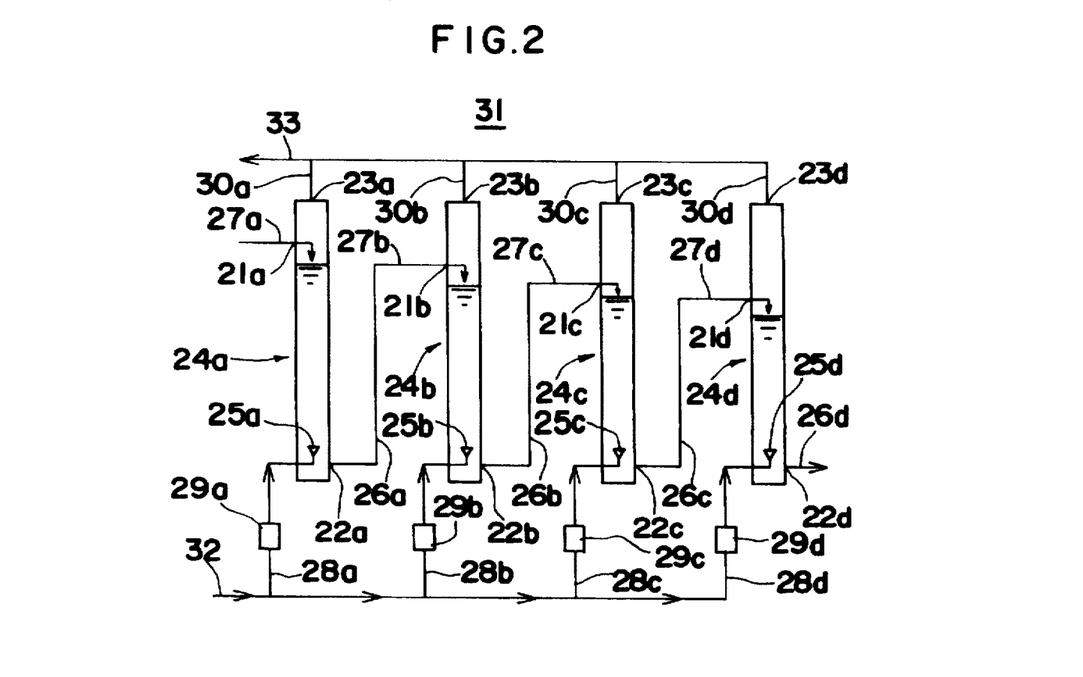
FIG. 2 is a schematic view showing an embodiment where four dissolved oxygen reducing apparatuses as shown in FIG. 1 are provided in series.

Reference is now made to FIG. 2 for illustrating a dissolved oxygen reducing apparatus 31 wherein four bubbling vessels 24 are provided in series.

The dissolved oxygen reducing apparatus 31 is used, for example, for producing pure water for semiconductors.

Reference numerals 24a, 24b, 24c and 24d indicate bubbling vessels. These four bubbling vessels have, respectively, pure water charge inlets 21a, 21b, 21c, 21d, pure water discharge outlets 22a, 22b, 22c, 22d and inert gas discharge ports 23a, 23b, 23c, 23d. In the bubbling vessels 24a, 24b, 24c and 24d, there are provided inert gas spargers 25a, 25b, 25c and 25d for bubbling, respectively. The pure water discharge outlets 22a, 22b, 22c and 22d are connected with pure water discharge pipes 26a, 26b, 26c and 26d, respectively. Reference numerals 27a, 27b, 27c and 27d are pure water charge pipes wherein the pure water charge pipe 27b is connected to the pure water discharge pipe 26a, the pure water charge pipe 27c is connected to the pure water discharge pipe 26b, and the pure water charge pipe 27d is connected to the pure water discharge pipe 26c. Indicated by 28a, 28b, 28c and 28d are bubbling inert gas charge pipes, which are branched from an inert gas charge main pipe 32, respectively. Indicated by 29a, 29b, 29c and 29d are flow control devices, and by 30a, 30b, 30c and 30d are bubbling inert gas discharge pipes, which are connected to an inert gas discharge main pipe 331 respectively.

In the dissolved oxygen reducing apparatus 31 of this embodiment, the bubbling vessels 24a to 24d, the pure water discharge pipes 26a to 26d and the pure water charge pipes 27b to 27d are made of PVDF which is a low oxygen permeating material.

Since the material for the portions through which pure water after the bubbling treatment flows is a low oxygen permeating material such as PVDF, it becomes possible to remarkably reduce the amount of dissolved oxygen in the treated pure water discharged from the final fourth bubbling vessel 24d to the pure water discharge pipe 26d over the known case using PVC. Moreover, the amount of the inert gas, such as nitrogen, can be reduced and the apparatus may be designed in a smaller size.

The pure water charge inlets 21a to 21d provided at the upper portions of the respective bubbling vessels 24a to 24d are positioned as being not higher from the first bubbling vessel 24a toward the fourth bubbling vessel 24d, so that smooth flow is ensured.

The pure water which is the untreated water fed from the pure water charge pipe 27a is first introduced to the upper portion of the first bubbling vessel 24a and subjected to bubbling treatment therein, after which it is introduced from the bottom of the first bubbling vessel 24a to the upper portion of the second bubbling vessel 24b. Thus, the pure water is subjected to a continuous four-stage bubbling treatment so that it is introduced from the bottom of a preceding bubbling vessel to the upper portion of the subsequent bubbling vessel. The treated pure water after completion of the bubbling treatment is discharged from the bottom of the fourth bubbling vessel 24d to the pure water discharge pipe 26d, followed by feeding to the subsequent step.

On the other hand, the inert gas which is fed for removing dissolved oxygen, e.g. nitrogen gas, at a given pressure is branched from the inert gas charge main pipe 32 into the bubbling inert gas charge pipes 28a to 28d which are provided at the respective bubbling vessels and passed into the respective flow control devices 29a to 29d where its flow rate is properly controlled. Thereafter, the inert gas is sparged into the pure water from the respective inert gas spargers 25a to 25d into the bubbling vessels. The nitrogen gas sparged into the pure water rises in the pure water in fine bubbles while entraining dissolved oxygen in the pure water, followed by being discharged from the inert gas discharge main pipe 33 through the respective inert gas discharge pipes 30a to 30d at the top of the vessels.

Figure 3:
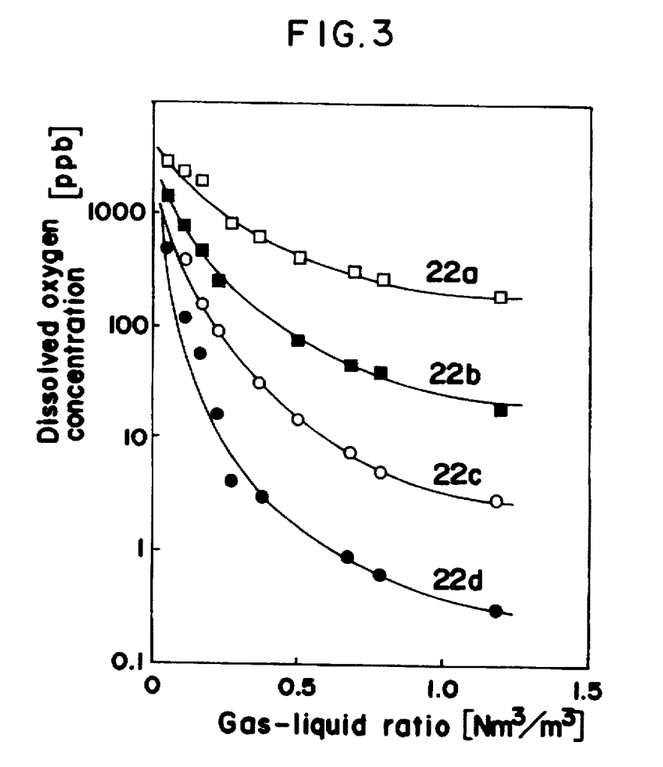
FIG. 3 is a diagram showing the relation between the gas-liquid ratio and the dissolved oxygen concentration in the dissolved oxygen reducing apparatus shown in FIG. 2.

FIG. 3 shows the results of a test wherein untreated water having a dissolved oxygen concentration of 7000 ppb was treated by means of the dissolved oxygen reducing apparatus 31 shown in FIG. 2. The concentrations of dissolved oxygen at the pure water discharge outlets 22a to 22d are shown with respect to the ratio between the amount of nitrogen gas and the amount of treated water (gas-liquid ratio=nitrogen [N m³/hour]/water [m³/hour] wherein N m³ represents the volume at 0° C. at 1 atm, the same shall apply hereinafter) The oxygen concentration in the nitrogen gas used is 20 ppb. As a measuring device for dissolved oxygen, Orbisphere (Model 2713) was used.

As will be apparent from FIG. 3, when the gas-liquid ratio is 0.6, water having a dissolved oxygen concentration of not higher than 10 ppb is obtained from the pure water discharge outlet 22c of the third bubbling vessel 24c. With a gas-liquid ratio of 0.3, pure water having a dissolved oxygen concentration of not higher than 10 ppb is obtained from the pure water discharge outlet 24d of the fourth bubbling vessel 24d. Where a conventional dissolved oxygen reducing apparatus made of PVC was operated under the same conditions as above, the dissolved oxygen concentration at the pure water discharge outlet of the fourth bubbling vessel was about 50 ppb at a gas-liquid ratio of 0.3. In addition, when the dissolved oxygen reducing apparatus was used so as to attain a dissolved oxygen concentration of not higher than 10 ppb at the pure water discharge outlet of the fourth bubbling vessel, the gas-liquid ratio was found to be 0.65.

Thus, in order that the amount of oxygen entering through the walls of the vessels and the pipes into the apparatus is less than the amount of oxygen being removed by bubbling of an inert gas in the apparatus for reducing dissolved oxygen in pure water by bubbling an inert gas, the walls of the bubbling vessels and the walls of the pure water discharge pipes are made of a low oxygen permeating material or materials having a coefficient of oxygen permeability of not higher than $10^{-9}$ cc.cm/cm²sec.atm at 25° C. With this, the dissolved oxygen can be efficiently removed using a reduced amount of an inert gas. For instance, the amount of dissolved oxygen in pure water for semiconductors can be readily reduced to not higher than 10 ppb.

In the above embodiment, examples wherein nitrogen gas is used for reducing dissolved oxygen in pure water was illustrated, but other inert gases such as argon, helium and the like may also be used. Moreover, if the oxygen concentration in the inert gas used for bubbling is reduced to as low as possible, the amount of oxygen contained in the inert gas is reduced, making it possible to further reduce the concentration of dissolved oxygen. For instance, using a nitrogen gas containing oxygen at the concentration of 100 ppb or less, there can be readily obtained ultra-pure water whose dissolved oxygen concentration is 1 ppb or less. On the other hand, although similar results may be obtained when the vessel and pipe walls are made thickener, the use of thick walls of the vessel and the pipe eventually leads to a large-sized apparatus, resulting in the increase in costs for the apparatus. Thus, this is not advantageous from the economical viewpoint.

Where a plurality of bubbling vessels are provided, it is not always necessary that all the bubbling vessels and piping portions have a coefficient of oxygen permeability at 25° C. of not higher than $10^{-9}$ cc.cm/cm²sec.atm as set forth hereinabove, and with only the bubbling vessel and the piping portion provided downstream of the apparatus having the coefficient of oxygen permeability as specified above, there can be obtained a liquid having a dissolved oxygen concentration not higher than in the prior art.

Figure 4:
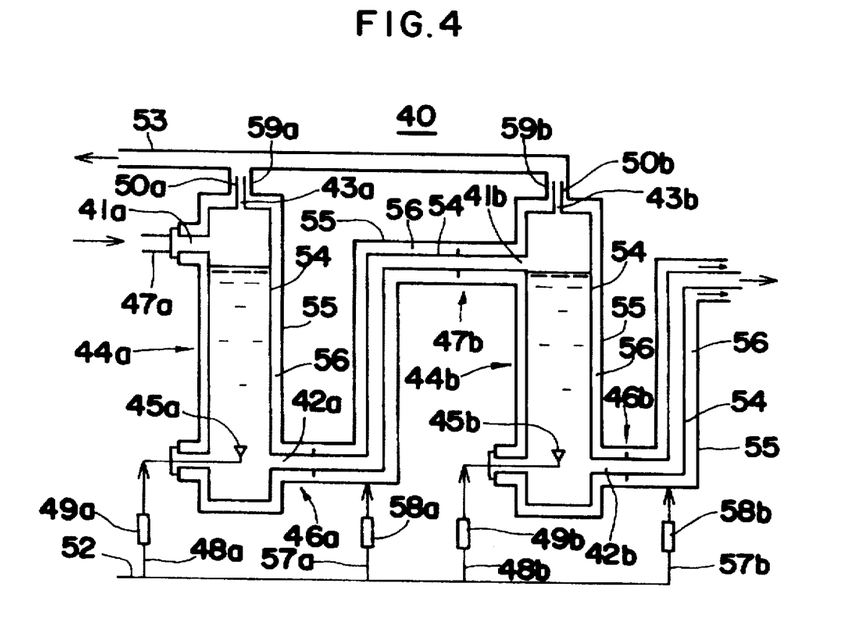
FIG. 4 is a schematic view showing another embodiment of a dissolved oxygen reducing apparatus of the present invention.

FIG. 4 is a schematic view showing another embodiment of a dissolved oxygen reducing apparatus of the invention, which is used, for example, to prepare pure water for semiconductors.

A dissolved oxygen reducing apparatus 40 is provided with two bubbling vessels 44a and 44b. These two bubbling vessels 44a, 44b have pure water charge inlets 41a, 41b, pure water discharge outlets 42a, 42b and inert gas discharge ports 43a, 43b, respectively. Within the bubbling vessels 44a, 44b, there are, respectively, placed inert gas spargers 45, 45b for pure water bubbling. The pure water discharge outlets 42a, 42b are, respectively, connected to pure water discharge pipes 46a, 46b. Reference numerals 47a, 47b indicate pure water charge pipes, respectively, and the pure water charge pipe 47b is connected to the pure water discharge pipe 46a.

The walls of the bubbling vessels 44a, 44b, the walls of the pure water discharge pipes 46a, 46b and the walls of the pure water charge pipe 47b have, respectively, a double wall structure having an inner wall 54 and an outer wall 55 between which an inert gas flow path 56 is formed.

A sealing inert gas is introduced from sealing inert gas introducing pipes 57a, 57b into inert gas flow path 56. The sealing inert gas introducing pipes 57a, 57b and bubbling inert gas introducing pipes 48a, 48b are branched from an inert gas charge main pipe 52, respectively. These introducing pipes have, respectively, flow control devices 58a, 58b, 49a, 49b. A bubbling inert gas discharge pipe 50a, a sealing inert gas discharge pipe 59a, and a bubbling inert gas discharge pipe 50b and a sealing inert gas discharge pipe 59b are joined, respectively, and connected to an inert gas discharge main pipe 53.

The dissolved oxygen reducing apparatus 40 has the inner walls 54 of the bubbling vessels 44a, 44b, the pure water discharge pipes 46a, 46b and the pure water introducing pipe 47b, which are made of clean polyvinyl chloride (C-PVC) wherein impurities in a binder are reduced in amount. The outer walls 55 are formed of inexpensive, ordinary polyvinyl chloride (PVC).

The pure water charge inlet 41b provided at the upper portion of the second bubbling vessel 44b is set at a position not higher than the pure water charge inlet 41 provided at the upper portion of the first bubbling vessel 44a.

In the dissolved oxygen reducing apparatus 40, a sealing inert gas such as, for example, nitrogen gas, is introduced into the inert gas flow path 56 so that the oxygen concentration in the flow path 56 is lowered. More particularly, the nitrogen gas which is passed as branched from the inert gas charge main pipe 52 is fed to the flow control devices 58a, 58b wherein its flow rates are controlled, followed by introduction from the sealing inert gas introducing pipes 57a, 57b into the inert gas flow path 56. The nitrogen gas introduced into the flow path 56 runs through the flow path 56 and is discharged from the inert gas discharge main pipe 53 through the sealing inert gas discharge pipes 59a, 59b while entraining oxygen passed through the outer walls 55. Accordingly, during the time when the nitrogen gas is running through the flow path 56, the partial pressure of oxygen in the flow path 56 is very low, so that the amount of oxygen which passes through the inner walls 54 and incorporates into pure water during the course of the treatment and after the treatment can be reduced.

The pure water which is the untreated water fed from the pure water charge pipe 47a is subjected to successive bubbling treatments in the bubbling vessels 44a, 44b and then fed from the pure water discharge pipe 46b to end-use.

The inert gas running through the inert gas flow path 56 of the pure water discharge pipe 46b may be exhausted from the end portion of the pipe 46b. It is preferred that if the pure water discharge pipe 46b is long, a charge port and a discharge port for the inert gas are provided at appropriate portions of the pipe 46b.

As described above, the bubbling vessels 44a, 44b, the pure water discharge pipes 46a, 46b and the pure water charge pipe 47b are sealed therearound with an inert gas such as nitrogen gas. Thus, the amount of oxygen which derives from the air and incorporates into pure water can be reduced, thereby preventing the increase in amount of dissolved oxygen in pure water. Thus, there can be obtained pure water whose dissolved oxygen concentration is 1 ppb or less.

As materials for forming the bubbling vessels and the pipes and also for outer vessels, there may be used general-purpose C-PVC and PVC. Hence, the apparatus can be fabricated at low costs. In addition, it is possible to reduce the amount of a bubbling inert gas and to design a small-sized apparatus.

Figure 5:
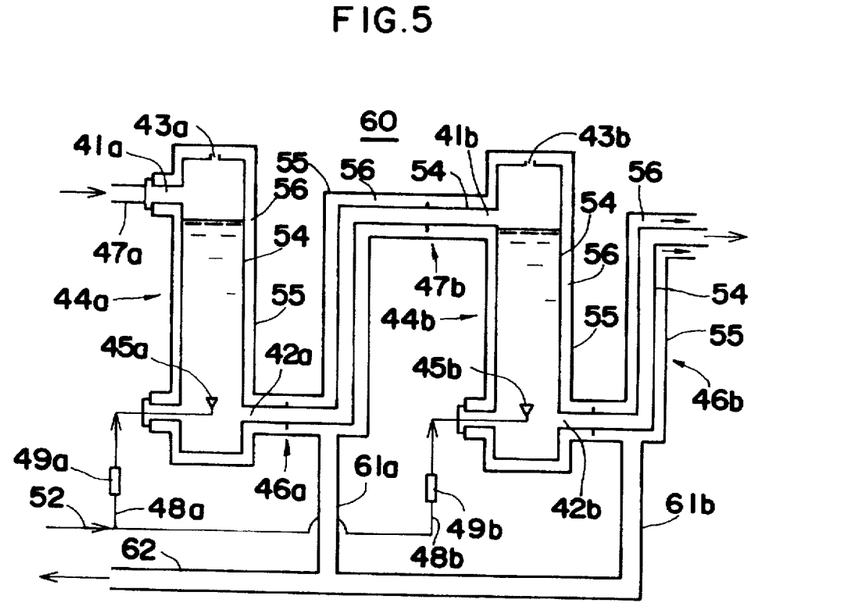
FIG. 5 is a schematic view showing a modified embodiment of a dissolved oxygen reducing apparatus shown in FIG. 4.

FIG. 5 is a schematic view showing a variation of the dissolved oxygen reducing apparatus shown in FIG. 4. Like elements or members as in the embodiment of FIG. 4 are indicated by like reference numerals and their detailed illustration is omitted.

A dissolved oxygen reducing apparatus 60 shown in FIG. 5 makes use of an inert gas, which has once been used for bubbling treatment in the bubbling vessels 44a and 44b for introduction into the inert gas flow path 56, for a sealing gas.

For this purpose, the bubbling inert gas discharge ports 43a and 43b are formed at the top of the bubbling vessels 44a and 44b, respectively, so as to communicate with the inert gas flow path 56. The sealing inert gas passing through the flow path 56 is discharged from a terminal end of the pure water discharge pipe 46b.

Accordingly, any sealing inert gas charge pipes 57a, 57b, flow control devices 58a, 58b, inert gas discharge main pipe 53 and sealing inert gas discharge pipes 59a, 59b shown in FIG. 4 are not provided in this embodiment.

When an inert gas is used for the bubbling treatment in large amounts, sealing inert gas discharge pipes 61a, 61b are connected, as shown in the Figure, to the inert gas flow path 56 at appropriate positions thereof, e.g. positions kept away from the bubbling inert gas discharge ports 43a, 43b. The inert gas discharge pipes 61a, 61b are connected to an inert gas discharge main pipe 62.

Thus, the dissolved oxygen reducing apparatus 60 makes use of an inert gas passing through the bubbling vessel as a sealing gas, by which there can be obtain pure water whose dissolved oxygen concentration is not higher than 1 ppb. In addition, the amount of the inert gas can be reduced significantly over that attained by the dissolved oxygen reducing apparatus 40 and the flow regulators can be omitted, thus leading to cost saving.

It will be noted that although the dissolved oxygen reducing apparatus 40 or 60 has two bubbling vessels, the number of the vessels can be optionally determined. Where a plurality of bubbling vessels are provided, it is not always necessary that all the bubbling vessels and the piping portions have such a double wall structure. It is possible to obtain a liquid having a dissolved oxygen concentration not higher than in prior art when only a bubbling vessel and a piping provided downstream of the apparatus have a double wall structure for gas sealing.

Figure 6:
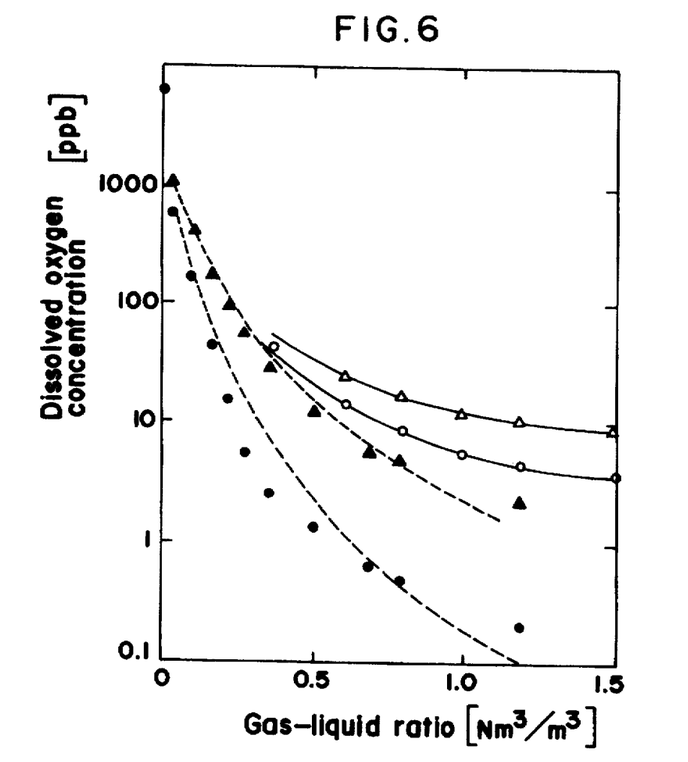
FIG. 6 is a diagram showing the relation between the gas-liquid ratio and the dissolved oxygen concentration in the case where four bubbling vessels of the dissolved oxygen reducing apparatus shown in FIG. 4 are used.

FIG. 6 is a diagram showing the relation between the gas-liquid ratio and the concentration of dissolved oxygen based on the results of a test in which untreated water containing 7000 ppb of dissolved oxygen was treated with an experimental apparatus similar to the dissolved oxygen reducing apparatus 40 shown in FIG. 4 except that four bubbling vessels were used.

The dissolved oxygen was measured using the Orbishere mentioned above.

FIG. 6 shows the dissolved oxygen concentration of pure water treated in the third bubbling vessel and the fourth bubbling vessel in relation to the feed rate of nitrogen and water (gas-liquid ratio=nitrogen [N m³/hour]/water [N m³/hour]). In FIG. 6, the symbols and "Δ" and "○" indicate the concentrations of dissolved oxygen at the pure water discharge outlets of the third bubbling vessel (symbol "Δ") and the fourth bubbling vessel (symbol "○") in the case where no nitrogen gas was introduced into the inert gas flow path for sealing, i.e. the atmosphere surrounding the respective bubbling vessels was air and the oxygen concentration was 21%. The symbols "▲" and "●" indicate the concentrations of dissolved oxygen at the pure water discharge outlets of the third bubbling vessel (symbol "▲") and the fourth bubbling vessel (symbol "●") in the case where nitrogen gas was passed through the sealing inert gas flow path so that the oxygen concentration around the bubbling vessels and the like was set at 40 ppm.

As will be apparent from the Figure, where the oxygen concentration around the bubbling vessels and the like was set at 40 ppm and the gas-liquid ratio is 0.7, there are obtained pure water having a dissolved oxygen content of 6 ppb from the third bubbling vessel and pure water having a dissolved oxygen content of 0.6 ppb from the fourth bubbling vessel. On the other hand, when the gas-liquid ratio is likewise 0.7 but under conditions where nitrogen gas sealing is not effected, pure water obtained from the third bubbling vessel has a dissolved oxygen content of 20 ppb and pure water obtained from the fourth bubbling vessel has a dissolved oxygen content of 10 ppb. With the apparatus wherein no sealing of nitrogen gas is effected, even when the gas-liquid ratio is increased, it is very difficult to reduce the dissolved oxygen to a certain level or below.

In the above test, the oxygen concentration in the sealing inert gas flow path was set at 40 ppm. If the oxygen concentration is made lower, e.g. at 1 ppm, the dissolved oxygen concentration in a treated liquid may be further reduced. In the test, the outer vessels were formed of PVC and any materials may be used in the practice of the invention provided that the oxygen concentration in the sealing inert gas flow path can be maintained at a level, for example, of 40 ppm or below. For instance, metals may be used.

Thus, in the dissolved oxygen reducing apparatus in which an inert gas is bubbled in a liquid to remove dissolved oxygen from the liquid, when the bubbling vessels and pipes through which a liquid after bubbling treatment is passed are arranged as having a double wall structure through which an inert gas is passed for sealing, larger amounts of dissolved oxygen can be removed by the use of a smaller amount of an inert gas. For instance, the amount of dissolved oxygen in ultra-pure water which is used in the field of the semiconductor industry can be readily reduced to not higher than 1 ppb.

Figure 7:
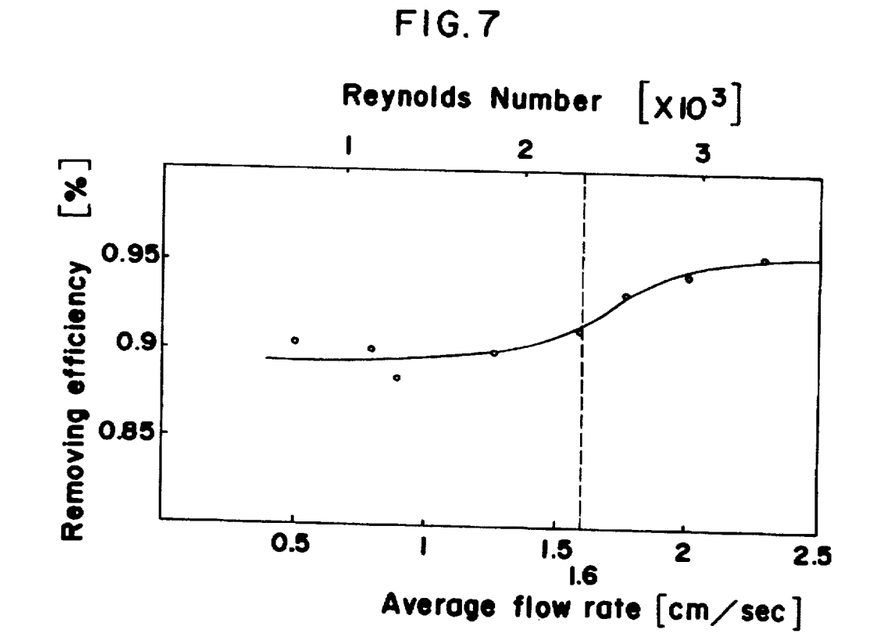
FIG. 7 is a diagram showing the relation between the removing efficiency of oxygen and the flow rate of pure water passing through the dissolved oxygen reducing apparatus shown in FIG. 1.

FIG. 7 is a diagram showing the relation between the removing efficiency of oxygen and the flow rate of pure water in the dissolved oxygen reducing apparatus shown in FIG. 1.

The oxygen removing efficiency (amount of removed oxygen/amount of oxygen in untreated water) was measured using the dissolved oxygen reducing apparatus 20 shown in FIG. 1 wherein an amount of nitrogen gas sparged from the inert gas sparger 25 into pure water was set at a constant level of 0.3 Nm³/hour and pure water having a dissolved oxygen concentration of about 100 ppb was introduced from the liquid charge inlet 21 into the bubbling vessel 24 at different flow rates. It will be noted that the bubbling vessel 24 had an inner diameter of 130 mm and a water level of about 2500 mm. The results are shown in FIG. 7.

As will be apparent from FIG. 7, when the flow rate of pure water exceeds 1.6 cm/sec so that the Reynolds number is in a turbulent transition region of about 2300 or higher, the oxygen removing efficiency sharply increases.

From the standpoint of the relation with the gas-liquid ratio, dissolved oxygen can be efficiently removed under conditions where the amount of the gas is constant and the flow rate of the pure water is increased, so that the amount of the pure water increases relative to the amount of the gas, i.e. under conditions where the gas-liquid ratio is low.

Thus, when the flow rate of pure water is set at higher than 1.6 cm/sec, the removing efficiency of the dissolved oxygen is improved. However, when the flow rate of pure water is increased, there appears a phenomenon where the bubbles are flown away as entrained with the stream of water. For instance, the average size of the bubbles in this embodiment is about 7 mm. The average rising speed of the bubbles in still pure water is about 90 cm/sec. In these bubbling operations, the diameter of the bubbles is not constant and has a certain size distribution, so that there exist bubbles whose size is smaller than the average size. It has been experimentally confirmed that the flow rate which permits all the bubbles to float upwardly without entraining small-size bubbles with the water stream running downwardly is not higher than ⅒ of the average rising speed of the bubbles. Accordingly, the upper limit of the flow rate of the pure water is generally 9.0 cm/sec.

More specifically, in order to permit all the inert gas introduced into pure water in the form of bubbles to float upwardly, the maximum flow rate of the pure water should be not greater than 9.0 cm/sec. In practice, taking into account the effect of improving the oxygen removing efficiency and the economical point of the pure water feed pump, it is preferred that the flow rate should be set within a range of about 2300 to about 5000 in terms of the Reynolds number.

The flow rate of pure water within a range of 1.6 to 9.0 cm/sec is effective especially when the dissolved oxygen concentration in untreated water to be introduced is approximately 100 ppb or below.

Figure 8:
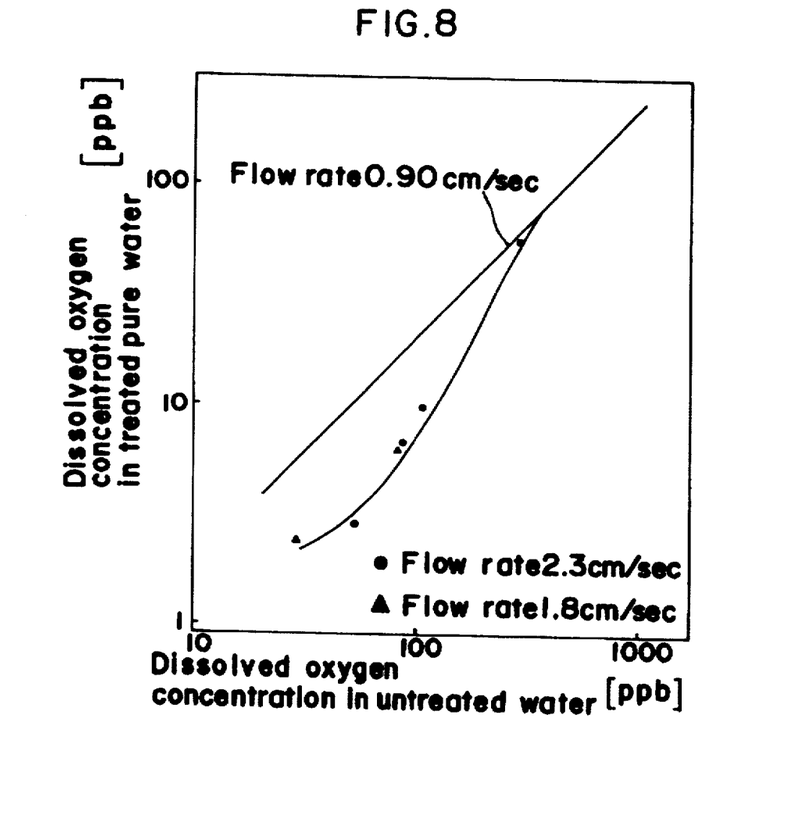
FIG. 8 is a diagram showing the relation between the dissolved oxygen concentration in the bubbling-treated water and the untreated water in the dissolved oxygen reducing apparatus of FIG. 1 for different flow rates of the water.

FIG. 8 shows the relation between the dissolved oxygen concentration in treated pure water and the dissolved oxygen concentration in untreated water at a flow rate of pure water of 0.9 cm/sec, a flow rate of pure water of 1.8 cm/sec (Reynolds number of about 2590) and a flow rate of pure water of 2.3 cm/sec (Reynolds number of about 3360) when the amount of nitrogen gas for bubbling is constant.

As will be apparent from FIG. 8, where the dissolved oxygen concentration in untreated water is close to 1000 ppb, the dissolved oxygen concentrations in treated pure water are substantially at a similar level at different flow rates. However, when the dissolved oxygen concentration in untreated water is about 100 ppb, a high flow rate of pure water results in a very low concentration of dissolved oxygen in treated water. In other words, the oxygen removing efficiency is improved. It will be noted that even when the concentration of dissolved oxygen in untreated water is high, there is the merit that the gas-liquid ratio becomes so great that pure water can be effectively bubbled in a small amount of an inert gas.

In this manner, the flow rate of pure water in the range of 1.6 to 9.0 cm/sec is suitable for further reducing and removing dissolved oxygen gas from pure water having a dissolved oxygen concentration of not higher than 100 ppb. Accordingly, a bubbling vessel in which the flow rate of pure water is set within a range of 1.6 to 9.0 cm/sec is disposed downstream of an ordinary dissolved oxygen reducing apparatus wherein the dissolved oxygen concentration in pure water is reduced to 10 to 100 ppb. Thus, there can be readily obtained pure water for semiconductors having a dissolved oxygen concentration of not higher than 10 ppb in necessary and sufficient amounts, such pure water being required for specific semiconductor manufacturing processes such as cleaning of silicon wafer surfaces.

If a branched pipe is connected to pipes connecting an ordinary dissolved oxygen reducing apparatus wherein a dissolved oxygen concentration in pure water is reduced to 10 to 100 ppb and a bubbling vessel wherein the flow rate of pure water is set in the range of 1.6 to 9.0 cm/sec, the pure water having a dissolved oxygen concentration of 10 to 100 ppb may be supplied, from the branched pipe, to a step which enables the use of pure water having a dissolved oxygen concentration of about 100 ppb.

Moreover, when the dissolved oxygen reducing apparatus described in the foregoing embodiments is provided in the vicinity of pure water applied facilities, a pure water discharge pipe connected to a final bubbling vessel of the apparatus can be shortened, thereby reducing costs of the pure water discharge pipe.

Industrial Utility

As described above, according to the dissolved oxygen reducing apparatus of the invention, since there can be obtained liquids which contain only very smaller amounts of dissolved oxygen, such an apparatus is very suitable for supplying pure water for semiconductors. In addition, since the content of dissolved oxygen is very small, pipes are inhibited from corrosion. Accordingly, such water can be suitably used as pure water for boilers or for cooling nuclear reactors. Since there is little danger of catching fire owing to the reduced content of dissolved oxygen, the water can be effectively utilized as pure water for pressurizing oilfields on exploiting of oil. Moreover, the water can be utilized as water stock for drink since it can suppress a change in quality due to oxidation of some components.

What is claimed is:

1. A dissolved oxygen reducing apparatus comprising a bubbling vessel having a liquid charge inlet, a liquid discharge outlet and an inert gas discharge port, an inert gas sparger provided within the bubbling vessel for providing inert gas to liquid contained in the bubbling vessel so as to reduce dissolved oxygen in the liquid, and a liquid discharge pipe connected to the liquid discharge outlet, wherein the bubbling vessel and the liquid discharge pipe have a coefficient of oxygen permeability not higher than $10^{-9}$ cc cm/cm² sec atm at 25° C.

2. The dissolved oxygen reducing apparatus according to claim 1, wherein the walls of said bubbling vessel and the walls of said liquid discharge pipe are made of a low oxygen permeating material having a coefficient of oxygen permeability of not higher than $10^{-9}$ cc cm/cm² sec atm at 25° C.

3. The dissolved oxygen reducing apparatus according to claim 2, wherein said low oxygen permeating material is selected from the group consisting of polyvinylidene fluoride, polyether ether ketone and polyphenylene sulfide.

4. The dissolved oxygen reducing apparatus according to claim 1, wherein the walls of said bubbling vessel and the walls of said liquid discharge pipe are made of a material selected from the group consisting of a metal which has been subjected to a corrosion-resistant coating treatment on an inner surface thereof, a metal coated with a resin on the inner surface thereof, and a resin covered with a metal on the outer surface thereof.

5. The dissolved oxygen reducing apparatus according to claim 1, wherein the walls of said bubbling vessel and the walls of said liquid discharge pipe have a double wall structure having an inert gas flow path between inner and outer walls thereof.

6. The dissolved oxygen reducing apparatus according to claim 5, wherein said inert gas flow path is communicated with said inert gas discharge port.

7. The dissolved oxygen reducing apparatus according to claim 2, further including a source of pure water communicating with the liquid charge inlet of said bubbling vessel and means for providing a flow rate of said pure water through said bubbling vessel within a range of 1.6 to 9.0 cm/sec.

* * * * *